June 17, 1947.　　　　　J. C. MEIER　　　　　2,422,580
ELECTRICAL APPLIANCE FOR MAKING COFFEE
Filed June 15, 1945　　　2 Sheets-Sheet 1

Inventor
Julian C. Meier
By Barthel & Bugbee
Attorneys

June 17, 1947. J. C. MEIER 2,422,580
ELECTRICAL APPLIANCE FOR MAKING COFFEE
Filed June 15, 1945 2 Sheets-Sheet 2

Inventor
Julian C. Meier
Barthel & Bugbee
Attorneys

Patented June 17, 1947

2,422,580

UNITED STATES PATENT OFFICE 2,422,580

ELECTRICAL APPLIANCE FOR MAKING COFFEE

Julian C. Meier, Detroit, Mich.

Application June 15, 1945, Serial No. 599,724

8 Claims. (Cl. 219—43)

The present invention relates to improvements in coffee-making apparatus and more particularly to a hot plate having automatic control therefor.

The primary object of the invention is to provide a coffee-making apparatus which may be set so as to be turned on at a predetermined time to facilitate the percolation of the coffee, after which the coffee may be maintained in a warm condition at a predetermined temperature until used.

Another object of the invention is to provide a coffee-making apparatus including a tiltable hot plate having high and low temperature heating elements which are controlled by the passage of the coffee-making liquid from one chamber in the percolator to another chamber so that after the coffee-making liquid has been fused through the coffee, it will be transferred to another container and thereby cause the tiltable platform to rock or tilt in such a manner as to cut off the high heating element and energized the low heating element so as to maintain the coffee in a heated condition until ready for use.

Another object of the invention is to provide a coffee-making apparatus in which the low heating element of the tiltable hot plate is controlled by a rheostat which may be preset to maintain the coffee at a predetermined temperature after the same has been made and before the same is used.

Another object of the invention is to provide a coffee-making apparatus which is entirely automatic and which may be filled with coffee and water before retiring at night so that at a predetermined time in the morning, the high temperature heating element will be energized to make the coffee and transfer the coffee-making liquid from one compartment of a multi-chambered coffee urn to another compartment so as to interrupt the current supply in the high temperature heating element and energize the low temperature heating element.

Another object of the invention is to provide a coffee-making apparatus including an electrical appliance for supporting a coffee urn having a tiltable platform having high and low temperature heating elements which are arranged to be alternately energized when the coffee-making liquid has been transferred from one of the chambers of the coffee-making urn to an adjacent chamber extending parallel therewith and in which the coffee is contained or supported in a receptacle having perforations for the passage of the coffee-making liquid and the coffee after it has been made.

Other objects and advantages of the invention will become apparent during the course of the following description of the accompanying drawings, wherein.

Figures 1, 5:
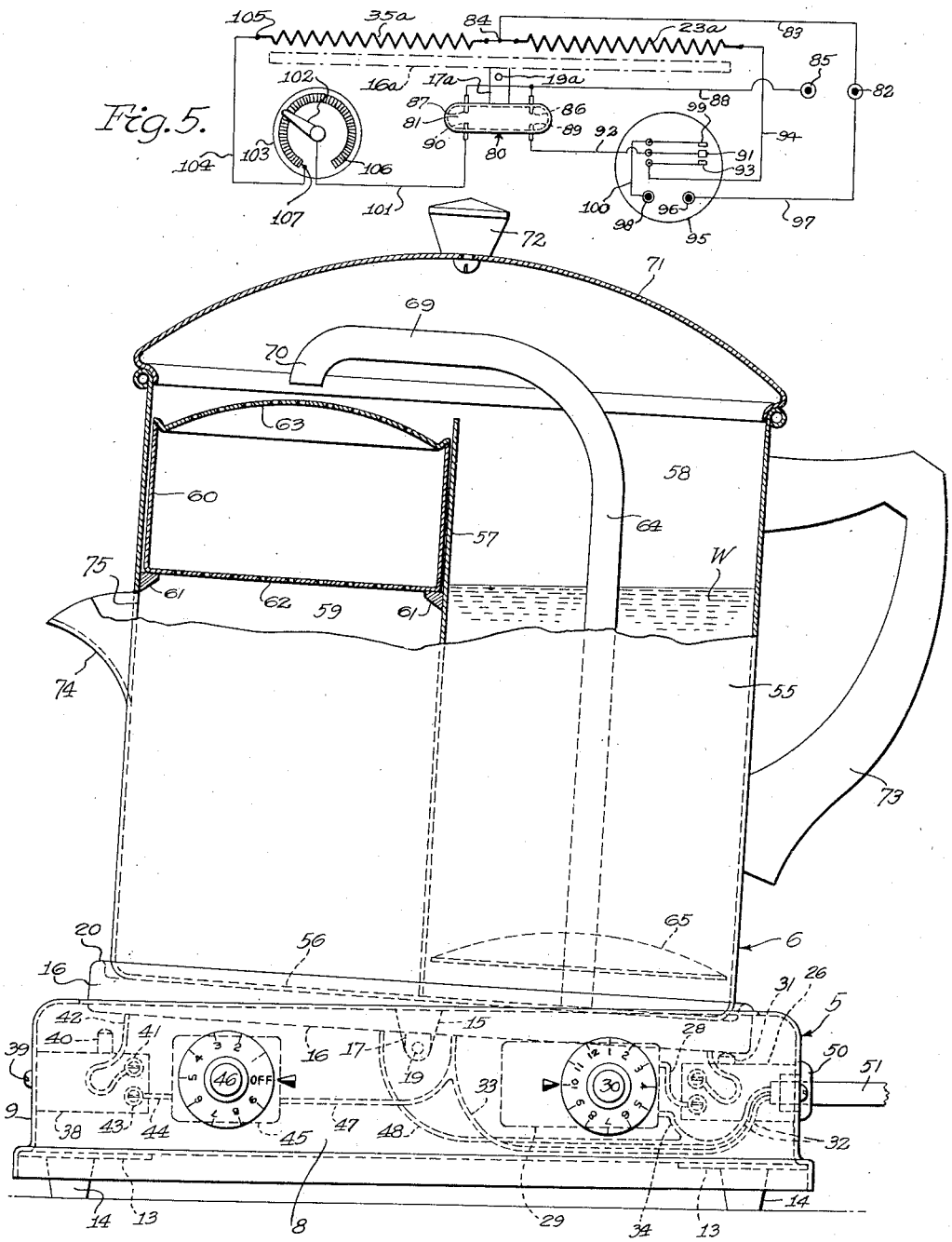
Figure 1 is a front elevational view of the coffee-making apparatus embodying the invention, illustrating a portion of the coffee urn or percolator broken away to show various structural details thereof.
Figure 4:
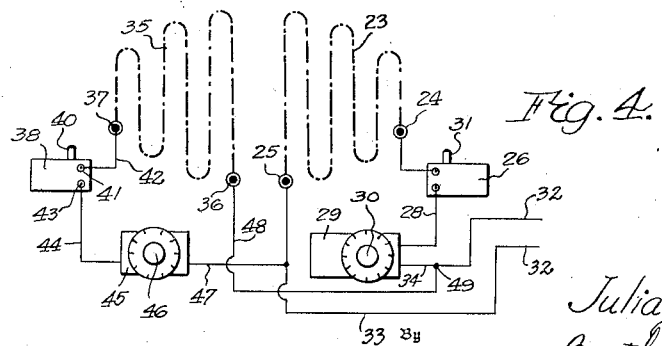

Figure 4 is a diagrammatic wiring diagram for electrically connecting the high and low temperature heating elements of the hot plate to a source of current and showing the arrangement of the control switches which are actuated by the tiltable hot plate as well as the circuit wiring for the time control switch and the rheostat; and Figure 5 is a diagrammatic view of a modified form of the invention in which the switch means for controlling the high and low temperature electric resistance heating elements is carried by the rockable platform.

In the drawings, the reference character 5 will generally represent an electrical appliance which may be conveniently supported upon a table or other surface for supporting a coffee-urn generally designated by the reference character 6.

Figure 2:
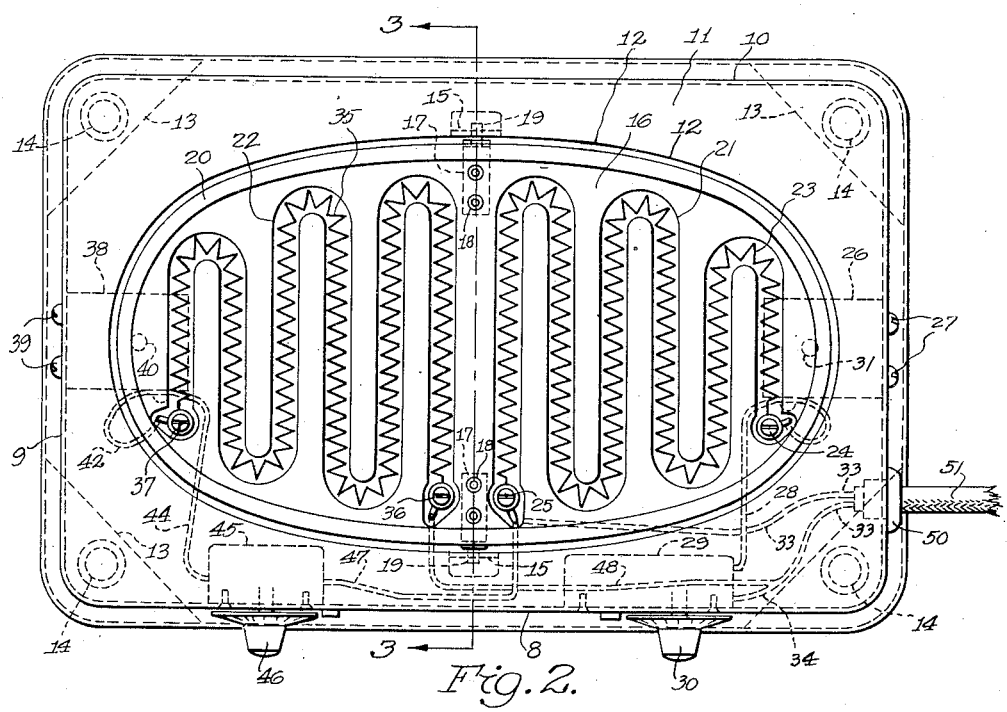
Figure 2 is a top plan view of the electrical appliance or hot plate for supporting the coffee urn.

The electrical appliance or hot plate comprises a base 7 which may be formed of a stamping to provide front, side and rear walls 8, 9 and 10 which are connected by a partial top wall 11 having an elliptical-shaped opening 12 (Figure 2). The base may be of rectangular form with the major axis of the elliptical opening 12 extending longitudinally thereof, and the corner portions of the base are provided with triangular-shaped plates 13 which are welded or otherwise fastened in place and are provided with foot pads 14 for supporting the base in spaced relation from the surface of the table or other support so that the heat from the hot plate will not mar the finish thereof.

Figure 3:
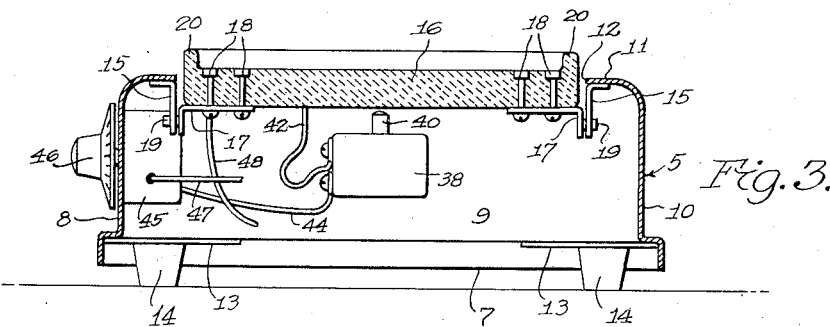
Figure 3 is a vertical cross-sectional view taken on line 3—3 of Figure 2 looking in the direction of the arrows and illustrating in detail the various structural parts of the hot plate and the arrangement of the various controls therefor.

Secured to the underside of the top wall 11 adjacent the elliptical opening 12 and on the minor axis thereof is a pair of oppositely arranged depending brackets 15 having aligned apertures or bearing openings in the lower portions thereof. A tiltable hot plate is adapted to be supported by the brackets 15 and includes an elliptical-shaped platform 16 formed of a dielectric material such as porcelain or the like having angle brackets 17 arranged in opposed relation and secured along the minor axis of the elliptical-shaped platform 16 by means of bolts or the like as at 18 (Figure 3). The angle brackets have their angle portions provided with pivot pins 19 which extend through the apertures in the depending brackets 15 and rockably support the elliptical platform about the minor axis thereof. The marginal edge of the elliptical-shaped tiltable platform 16 is provided with an unstanding flange 20 and the upper surface of the platform is provided with a pair of sinusoidal grooves 21 and 22 which zigzag to and fro on opposite sides of the major axis of the tiltable platform.

Mounted in the sinusoidal groove 21 is a high temperature electric heating element 23 which has one end connected to a binding post or screw 24 and the opposite end connected to a post 25. The posts 24 and 25 extend downwardly through suitable openings in the tiltable platform and the post 24 is connected to a pushbutton switch 26 secured to one of the end walls 9 of the base 7 by means of screws or the like as at 27. The other terminal of the switch 26 is connected by a line 28 to a time control switch 29 which is mounted in back of the front wall 8 of the base and is held in place by suitable screws so that the control knob thereof as at 30 may be adjusted to set the time control switch 29 for operation at a predetermined time period. The control switch 26 has its push button 31 arranged beneath the tiltable hot plate 16 on a line with the major axis thereof so that when the tiltable hot plate is rocked in one direction, the switch 26 will be closed, whereupon at a specified time, the time control switch 29 will likewise close and energize the high temperature element 23 with a source of electric current 32, such as a house or domestic supply. A lead line or wire 33 connects the other post 25 of the electric heating element 23 with the source of electric energy 32 and a wire 34 connects the other side of the time control switch 29 with the source of electric energy 32.

Mounted in the other sinusoidal groove 22 is a low temperature electric heating element 35 which has one of its ends connected to a post 36 adjacent the minor axis of the tiltable hot plate 16 while the opposite end is connected to a post 37 adjacent the end of the tiltable hot plate. A control switch 38 similar to the control switch 26 is secured to the other side wall of the casing 5 by screws or the like as at 39 so that a portion of the switch will project beneath the tiltable hot plate 16 with its push button 40 arranged so as to be engaged by said tiltable hot plate when the same is rocked about its minor axis. The post 37 is connected to one of the terminals 41 of the push button switch 38 by means of a lead wire 42 and the other terminal 43 of the push button 38 is connected by a lead wire 44 to an adjustable rheostat 45 which is mounted on the front wall 8 of the base and is held in place by screws or the like so that the adjusting knob 46 thereof may be controlled and manipulated from the front of the electrical appliance. The other terminal of the rheostat 45 is connected to the source of current 32 by means of a lead wire 47 which connects with the lead wire 33 and the circuit is completed through the electric heating element 35 by means of the lead wire 48 which is connected to the post 36 and has its other end connected to the other side of the source of electric energy 32 as at 49. The rheostat 45 may be of the off and on type in which the control knob in one of its extreme positions will interrupt the current through the electric heating element 35 and controls the energization of said heating element when the coffee is used.

The cables 32 pass through a bushing 50 in one of the side walls 9 of the base 5 and may extend to a domestic or house current outlet box through a single cable 51.

The coffee urn 6 includes a container 55 of ovate cross-section having a bottom wall 56 adapted to fit the elliptical-shaped tiltable hot plate 16 so that the upstanding flange thereon as at 20 will retain the coffee urn in position. A vertical partition wall 57 is provided in the coffee urn 6 and extends along the minor axis thereof to divide the coffee urn into a liquid containing chamber 58 and a coffee-making chamber 59. It is to be noted that the partition wall 57 extends from the bottom wall 56 to a point adjacent the top of the coffee urn where it terminates so as to form liquid-tight receptacles on opposite sides thereof. A coffee container 60 is mounted in the coffee-making chamber 59 and is supported on a series of spaced stop members 61. The coffee container 60 is shaped semi-elliptical to fit snugly within the compartment 59 and is provided with a perforated bottom wall 62 and a removable perforated top wall 63.

A liquid conducting tube 64 is mounted in the water compartment 58 and is provided at its lower end with an outwardly and downwardly extending flange 65 which is arranged in spaced relation from the bottom wall 56 of the coffee urn when the liquid or water W in the chamber 58 has reached its boiling point so as to conduct said water or liquid upward through the pipe 64 by reason of the pressure differential in the pipe. The free end of the pipe 64 is angularly bent as at 69 to extend in the direction of the compartment 59 where it terminates in a downwardly extending spout 70 directly above the perforated removable top wall 63 of the coffee container 60. The conduction tube 64 may be removed for the purpose of cleaning and is freely supported within the compartment 58.

A cover or closure 71 is provided for the coffee urn 6 and a handle 72 is secured to the cover for the removal thereof. A handle 73 is secured to the coffee urn and may be affixed thereto by suitable means (not shown). The compartment 59 is formed with a pouring lip 74 which communicates with a pouring opening 75 to facilitate the pouring of the coffee from the compartment 59 when the same has been made.

In operation, the coffee urn 6 is arranged as shown in Figure 1 on the tiltable hot plate 16 and the chamber 58 thereof is filled or partially filled with water W, also indicated in Figure 1. A quantity of coffee is then placed in the coffee container 60 and the tiltable hot plate 16 assumes a position as shown in Figure 1, wherein one end thereof will engage the push button 31 of the push button switch 26 and electrically connect the high temperature heating element 23 with the time control switch 29. The time control switch 29 may be set to close the circuit through the high temperature heating element 23 and the push button 26 and source of electric energy 32 at a predetermined time so that upon energization of the high temperature heating element 23 the water W in the compartment 58 will be heated to its boiling point and transferred through the conduction tube 64 so as to drip through the coffee contained in the receptacle 60. After all of the water has thus been transferred from the compartment 58 to the compartment 59 and passed through the coffee in the coffee container 60, the tiltable hot plate 16 will rock about its minor axis and release the push button 31, so as to de-energize the high temperature heating element 23. Simultaneously, the opposite end of the tiltable hot plate will depress the push button 40 of the push button switch 38 to cause energization of the low temperature heating element 35 through the rheostat 45, lines 47 and 48 and thence to the current supply lines 32 by way of the connections 33 and 49 respectively. At the same time that the time control switch 29 is set to energize the high temperature heating element 23, the rheostat 45 may be preset so that the low temperature heating element 35 will be maintained at a predetermined low temperature and thereby retain the temperature of the coffee in the compartment or chamber 59 at the appropriate temperature before the same is used.

In the modified form of the invention as shown in Figure 5, the heating element control switch is wholly supported by a rockable platform 16a similar to the platform 16 shown and described in the form of the invention illustrated in Figures 1 to 4 inclusive, and as indicated, includes a liquid contact switch 80 of the "Mercoid type" having a hermetically sealed glass container 81 provided with a small quantity of mercury which is adapted to flow from one end of the container to the other when the platform and container are rocked to and fro. The rockable platform 16a is provided with angle fulcrum members 17a similar to the fulcrum brackets 17 (Figures 1 to 4 inclusive) and one of the fulcrum members 17a depends downwardly below the fulcrum pin 19a a considerable distance for supporting thereon the liquid contact switch member 80.

High and low temperature heating elements 23a and 35a are carried by the rockable platform 16a and are adapted to be successively energized when the platform is rocked or tilted in the manner shown and described in Figures 1 to 4 inclusive. One terminal of a source of electrical energy supply 82 is connected to the adjacent terminals of the electric heating elements 23a and 35a by means of a lead wire 83 as at 84 while the other terminal 85 of the source of electrical energy supply is connected to a pair of electrodes 86 and 87 mounted one adjacent each end of the container by means of a lead wire 88.

Another pair of switch contacts or electrodes 89 and 90 are mounted in the glass container 80 arranged one adjacent each end and disposed respectively in opposition to the switch electrodes 86 and 87. A time controlled switch including a stationary contact 91 connected with the switch electrode 89 by a lead wire 92 and a movable contact 93 connected to the other terminal of the high temperature heating element 23a by means of a lead wire 94, is provided for initially energizing the high temperature electrical heating element as pointed out in the form of the invention shown in Figures 1 to 4 inclusive. The movable contact 93 is adapted to be controlled by an electric clock 95 having one of its terminals 96 connected to one of the terminals 82 of the electrical energy source by means of a lead wire 97 while the other terminal 98 of the electric clock is adapted to be connected to another contact 99 by means of a lead wire 100. Thus, when the "Mercoid type" switch 80 is tilted so that the quantity of mercury in the container will be in a position to close the gap between the switch electrodes 86 and 89, electrical energy will initially energize the high temperature electric heating element 23a through the contacts 91 and 93 at a predetermined time, or at a time at which the electric clock has been previously set.

The other electrodes 87 and 90 in the other end of the glass container 80 are adapted to close a circuit for the low temperature electric heating element 35a through a lead wire 101 which is connected to the switch electrode 90 and to the adjustable arm 102 of a rheostat 103. A lead wire 104 is connected to the other terminal of the low temperature electric heating element 35a as at 105 and is connected to the resistance winding 106 of the adjustable rheostat as at 107. It will thus be seen that after the coffee has been percolated, the platform 16a will be rocked or tilted so that the low temperature heating element 35a will be energized to maintain the coffee at a predetermined temperature until such time as it is used in substantially the same manner as pointed out and described in connection with the form of the invention shown in Figures 1 to 4 inclusive.

It is to be noted that a compact and unitary structure is provided in which all of the parts cooperate and that the coffee urn is so constructed as is also the tiltable hot plate, to provide a compact structure and one in which the coffee urn is not required to be balanced in a precarious position, liable to tilt or be knocked over during use.

It is to be understood that the forms of the invention herewith shown and described are to be taken as preferred embodiments thereof and that various changes may be made in the shape, size and arrangement of parts without departing from the spirit of the invention or the scope of the subjoined claims.

What I claim is:

1. An apparatus for making coffee, comprising a base, a rockable platform mounted on said base, a high temperature electric heating element mounted on one side of the rock axis of the platform, a low temperature electric heating element mounted on the other side of the rock axis of said platform, a source of electric energy, switch means controlled by the rocking movement of said platform for alternately connecting said source of electric energy to said high and low temperature electric heating elements, a coffee making receptacle mounted on the rockable platform having a pair of compartments arranged side-by-side therein, said compartments comprising a liquid compartment disposed above the high temperature electric heating element and a coffee compartment disposed above the low temperature electric heating element, and means in said coffee-making receptacle for transferring liquid from said liquid compartment to said coffee compartment whereby said rockable platform will be tilted to de-energize the high temperature electric heating element and energize the low temperature heating element.

2. An apparatus for making coffee, comprising a base, a rockable platform mounted on said base, a high temperature electric heating element mounted on one side of the rock axis of the platform, a low temperature electric heating element mounted on the other side of the rock axis of said platform, a source of electric energy, switch means controlled by the rocking movement of said platform for alternately connecting said source of electric energy to said high and low temperature electric heating elements, a coffee making receptacle mounted on the rockable platform having a liquid compartment disposed above the high temperature electric heating element and a coffee compartment disposed above the low temperature electric heating element, means in said coffee-making receptacle for transferring liquid from said liquid compartment to said coffee compartment whereby said rockable platform will be tilted to de-energize the high temperature electric heating element and energize the low temperature heating element, and a rheostat in circuit with the low temperature heating element and source of electric energy to facilitate adjustment of said heating element to a predetermined temperature to maintain the contents in the coffee compartment at a preset temperature.

3. An apparatus for making coffee, comprising a base, a rockable platform mounted on said base, a high temperature electric heating element mounted on one side of the rock axis of the platform, a low temperature electric heating element mounted on the other side of the rock axis of said platform, a source of electric energy, switch means controlled by the rocking movement of said platform for alternately connecting said source of electric energy to said high and low temperature electric heating elements, a coffee making receptacle mounted on the rockable platform having a liquid compartment disposed above the high temperature electric heating element and a coffee compartment disposed above the low temperature electric heating element, means in said coffee-making receptacle for transferring liquid from said liquid compartment to said coffee compartment whereby said rockable platform will be tilted to de-energize the high temperature electric heating element and energize the low temperature heating element, a time controlled switch in circuit with said high temperature electric heating element to energize the high temperature electric heating element at a predetermined time, and a rheostat in circuit with the low temperature heating element and source of electric energy to facilitate adjustment of said heating element to a predetermined temperature to maintain the contents of the coffee compartment at a preset temperature.

4. An electrical appliance for making coffee in a coffee urn having a pair of compartments arranged in side by side relationship so that liquid may be transferred from one compartment to the other when the same has reached a predetermined temperature, comprising a base, a rockable platform mounted on said base, high and low temperature heating elements mounted on said platform, a source of electric energy, switch means adjacent the ends of said platform controlled by the movement of said platform to alternately connect the heating elements to the source of electric energy, a time controlled switch in circuit with the high temperature heating element and source of electric energy to energize said high temperature heating element at a predetermined time, whereby the liquid in one of said compartments will be heated and transferred to the other compartment to thereby rock said platform so as to de-energize the high temperature heating element and energize the low temperature heating element, and a rheostat in circuit with the low temperature heating element and source of electric energy to permit said liquid to be maintained at a predetermined temperature after it has been transferred from one compartment to the other.

5. An electrical appliance for making coffee, comprising a base, a coffee urn rockably supported on said base having water and coffee compartments arranged in side by side relationship, liquid conduction means for transferring the contents of the water compartment to the coffee compartment when the water compartment has been heated to a predetermined temperature, a high temperature electrical heating element arranged in heat transfer relation with said water compartment, a low temperature electrical heating element arranged in heat transfer relation with the coffee compartment, a source of electric energy, normally open switch means for electrically connecting the high temperature electric heating element to the source of electric energy when said coffee urn is tilted in the direction of said water compartment, and normally open switch means for electrically connecting the low temperature electric heating element with the source of electric energy when said coffee urn is tilted in the direction of said coffee compartment in response to the transfer of liquid through said liquid conduction means from said water compartment to said coffee compartment whereby said heating elements will be successively energized to first heat the contents of the water compartment to cause the same to be transferred to the coffee compartment and then maintain the contents of the coffee compartment at a predetermined temperature.

6. An electrical appliance for making coffee, comprising a base, a coffee urn rockably supported on said base having water and coffee compartments arranged in side by side relationship, liquid conduction means for transferring the contents of the water compartment to the coffee compartment when the water compartment has been heated to a predetermined temperature, a high temperature electrical heating element arranged in heat transfer relation with said water compartment, a low temperature electrical heating element arranged in heat transfer relation with the coffee compartment, a source of electric energy, normally open switch means for electrically connecting the high temperature electric heating element to the source of electric energy when said coffee urn is tilted in the direction of said water compartment, normally open switch means for electrically connecting the low temperature electric heating element with the source of electric energy when said coffee urn is tilted in the direction of said coffee compartment whereby said heating elements will be successively energized to first heat the contents of the water compartment to cause the same to be transferred to the coffee compartment and then maintain the contents of the coffee compartment at a predetermined temperature, and a rheostat in circuit with the low temperature electrical heating element and source of electric energy to regulate the temperature of the low temperature heating element.

7. An electrical appliance for making coffee, comprising a base, a coffee urn rockably supported on said base having water and coffee compartments arranged in side by side relationship, liquid conduction means for transferring the contents of the water compartment to the coffee compartment when the water compartment has been heated to a predetermined temperature, a high temperature electrical heating element arranged in heat transfer relation with said water compartment, a low temperature electrical heating element arranged in heat transfer relation with the coffee compartment, a source of electric energy, normally open switch means for electrically connecting the high temperature electric heating element to the source of electric energy when said coffee urn is tilted in the direction of said water compartment, normally open switch means for electrically connecting the low temperature electric heating element with the source of electric energy when said coffee urn is tilted in the direction of said coffee compartment whereby said heating elements will be successively energized to first heat the contents of the water compartment to cause the same to be transferred to the coffee compartment and then maintain the contents of the coffee compartment at a predetermined temperature, a time controlled switch in circuit with the high temperature electrical heating element and source of electrical energy to initiate energization of said high temperature heating element at a predetermined time, and a rheostat in circuit with the low temperature electrical heating element and source of electric energy to regulate the temperature of the low temperature heating element.

8. An electrical appliance for making coffee, comprising a base having an elliptical opening in its top wall, a tiltable platform arranged in said opening to oscillate about its minor axis, a coffee urn mounted on said platform having a water chamber and a coffee chamber arranged in side by side relationship, means for conducting water from the lower portion of said water chamber to the upper portion of said coffee chamber to be infused over the coffee therein, a high temperature electric heating element carried by the tiltable platform in heat transfer relation with said water chamber, a low temperature heating element carried by the tiltable platform in heat transfer relation with the coffee chamber, a source of electric energy for said heating elements, switch means connecting said heating elements and source of electric energy for alternately energizing the heating elements when the tiltable platform is rocked about its minor axis, a time controlled switch in circuit with the source of electric energy and high temperature electric heating element for initiating energization of the high temperature electric heating element at a preselected time, and a rheostat in circuit with the low temperature heating element and source of electric energy for controlling the temperature of said low temperature heating element.

JULIAN C. MEIER.

REFERENCES CITED

The following references are of record in the file of this patent:

UNITED STATES PATENTS

| Number | Name | Date |
| --- | --- | --- |
| 1,831,013 | Kouyoumjian | Nov. 10, 1931 |
| 1,287,378 | Malcamp | Dec. 10, 1918 |
| 1,816,994 | Armstrong | Aug. 4, 1931 |
| 2,181,090 | Lucia | Nov. 21, 1939 |

FOREIGN PATENTS

| Number | Country | Date |
| --- | --- | --- |
| 400,672 | Great Britain | Nov. 8, 1932 |